(12) United States Patent
Ueno et al.

(10) Patent No.: US 8,119,252 B2
(45) Date of Patent: Feb. 21, 2012

(54) ELECTROCONDUCTIVE ENDLESS BELT AND IMAGE-FORMING APPARATUS INCLUDING THE SAME

(75) Inventors: Yoshikazu Ueno, Yokohama (JP); Toshiaki Shimomura, Yokohama (JP); Takahiro Suzuki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 888 days.

(21) Appl. No.: 11/997,633

(22) PCT Filed: Jul. 27, 2006

(86) PCT No.: PCT/JP2006/314897
§ 371 (c)(1),
(2), (4) Date: Feb. 1, 2008

(87) PCT Pub. No.: WO2007/015422
PCT Pub. Date: Feb. 8, 2007

(65) Prior Publication Data
US 2010/0158584 A1    Jun. 24, 2010

(30) Foreign Application Priority Data
Aug. 2, 2005  (JP) ................................. 2005-223812

(51) Int. Cl.
*C08G 18/42* (2006.01)
(52) U.S. Cl. ........ 428/480; 252/511; 399/302; 399/303; 524/496; 524/539; 525/418
(58) Field of Classification Search .................. 524/539; 399/302, 303; 525/418
See application file for complete search history.

(56) References Cited

U.S. PATENT DOCUMENTS

| | | | |
|---|---|---|---|
| 3,954,689 A * | 5/1976 | Hoeschele | 528/295.3 |
| 4,212,791 A * | 7/1980 | Avery et al. | 524/539 |
| 4,900,610 A * | 2/1990 | Hochberg et al. | 428/195.1 |
| 5,628,957 A * | 5/1997 | Collette et al. | 264/512 |
| 6,461,698 B1 * | 10/2002 | Bassam et al. | 428/35.7 |

FOREIGN PATENT DOCUMENTS

| | | |
|---|---|---|
| JP | 2001-247677 A | 9/2001 |
| JP | 2001-305874 A | 11/2001 |
| JP | 2002-132053 A | 5/2002 |

(Continued)

OTHER PUBLICATIONS

Machine translation of Suzuki, JP 2005-266760 A, retrieved Aug. 10, 2010.*
Machine translation of JP 2003-012949 A, retrieved Aug. 10, 2010.*

*Primary Examiner* — Mark Eashoo
*Assistant Examiner* — Nicole M Buie-Hatcher
(74) *Attorney, Agent, or Firm* — Sughrue Mion, PLLC

(57) ABSTRACT

An electroconductive endless belt can withstand repeated continuous operation, in particular has anti-setting properties, and has consistent gloss and electrical conductivity. An image-forming apparatus including the electroconductive endless belt is also provided. The electroconductive endless belt contains a substrate and a conductive filler. The substrate contains a thermoplastic polyalkylene naphthalate resin and at least two types of thermoplastic resins having an ester bond other than the thermoplastic polyalkylene naphthalate resin. The weight ratio of the thermoplastic polyalkylene naphthalate resin to the at least two types of thermoplastic resins having an ester bond is in the range of 95:5 to 55:45. The at least two types of thermoplastic resins having an ester bond contains at least one amorphous thermoplastic resin and at least one crystalline thermoplastic resin.

21 Claims, 2 Drawing Sheets

(a)

(b)

FOREIGN PATENT DOCUMENTS

| | | |
|---|---|---|
| JP | 2003-012949 A | 1/2003 |
| JP | 2005-084247 A | 3/2005 |
| JP | 2005-156955 A | 6/2005 |
| JP | 2005-164674 A | 6/2005 |
| JP | 2005266760 A * | 9/2005 |

* cited by examiner (a)

(b)

ELECTROCONDUCTIVE ENDLESS BELT AND IMAGE-FORMING APPARATUS INCLUDING THE SAME

TECHNICAL FIELD

The present invention relates to an electroconductive endless belt (hereinafter referred to simply as "belt") that is used to transfer a toner image onto a recording medium, such as paper. The toner image is formed by supplying a developer onto a surface of an image-forming unit, such as a latent image carrier having an electrostatic latent image on the surface thereof, in an electrostatic recording process of electrophotographic apparatuses or electrostatic recording apparatuses, such as copying machines and printers. The present invention also relates to an image-forming apparatus including the electroconductive endless belt.

BACKGROUND ART

Heretofore, in an electrostatic recording process with copying machines or printers, first, a surface of a photosensitive body (latent image carrier) is uniformly electrified. An image is then projected onto the photosensitive body by an optical unit to remove electric charges corresponding to the image, thus forming an electrostatic latent image. Toner fed to the surface is electrostatically deposited on the electrostatic latent image to form a toner image. The toner image is then transferred onto a recording medium, such as paper, a transparency for OHR, or photographic paper, for printing.

The same procedure is basically followed in printing with color printers or color copying machines. Furthermore, in color printing, four types of color toner of magenta, yellow, cyan, and black are used to reproduce colors. Thus, these four types of toner must be superimposed at a predetermined ratio to reproduce colors. Several methods have been proposed for this color reproduction process.

One of the methods is image-on-image development. In this method, when an electrostatic latent image is visualized by feeding toner onto a photosensitive body, as in monochrome printing, the four types of color toner of magenta, yellow, cyan, and black are sequentially superimposed to develop the electrostatic latent image, thus forming a color toner image on the photosensitive body. Although this method can reduce the size of apparatus, it is very difficult to control the gradation by the method. Thus, high image quality is rarely achieved.

A second method is a tandem method including four photosensitive drums. In this system, each latent image on the four photosensitive drums is developed with magenta, yellow, cyan, or black toner, thus forming a magenta toner image, a yellow toner image, a cyan toner image, and a black toner image. The four toner images formed on the respective tandem photosensitive drums are sequentially transferred onto a recording medium, such as paper, to produce a superimposed color image. This second method can provide a high-quality image. However, the tandem method requires a series of four photosensitive drums, and a charging mechanism and a developing mechanism for each of the photosensitive drums. This increases the size and the cost of the apparatus.

FIG. 2 illustrates an example of a print section in a tandem image-forming apparatus. Four print units for yellow Y toner, magenta M toner, cyan C toner, and black B toner are disposed in series. Each of the print units is composed of a photosensitive drum 1, a charging roller 2, a developing roller 3, a developing blade 4, a toner-supply roller 5, and a cleaning blade 6. A sheet is conveyed on a transferring and conveying belt 10, which is driven by a drive roller (drive unit) 9. The four types of toner are sequentially transferred to the sheet to form a color image. The transferring and conveying belt is electrified by a charging roller 7. Electric charges on the transferring and conveying belt are removed by a charge-removing roller 8. Furthermore, a sheet is electrified by an adsorption roller (not shown) to be adsorbed on the belt. This structure can prevent the generation of ozone. A sheet is sent from a conveying path to the transferring and conveying belt by the adsorption roller, and is electrostatically adsorbed on the transferring and conveying belt also by the action of the adsorption roller. After a transferring process, a sheet is detached from the transferring and conveying belt by self-stripping utilizing the curvature of a drum, which is effected by lowering the transfer voltage to reduce the attraction force between the sheet and the transferring and conveying belt.

The transferring and conveying belt 10 may be formed of a resistive material or a dielectric material. The resistive material and the dielectric material have both advantages and disadvantages. A resistive belt retains electric charges only for a short time. When the resistive belt is used for tandem transfer, therefore, a lesser number of electric charges are injected into the belt during a transferring process. Thus, the voltage of the belt is not largely increased after the continuous transcription of four colors. Furthermore, electric charges are released before the transcription to the next sheet. It is therefore unnecessary to reset the belt electrically. However, environmental variations may change the resistance of the resistive belt, thus affecting the transfer efficiency. The thickness or the width of a sheet may also affect the transfer efficiency.

In contrast, a dielectric belt does not spontaneously release electric charges. Thus, the injection and the emission of electric charges must be controlled electrically. However, electric charges are stably held on the belt. This ensures reliable adsorption and precise conveyance of a sheet. Furthermore, the dielectric constant does not significantly depend on the temperature and the humidity. Thus, the dielectric belt allows relatively stable transferring, independent of environmental variations. One disadvantage is the accumulation of electric charges on the belt during repeated transfer. The accumulation of electric charges increases the transfer voltage.

A third method is a transfer drum method. A recording medium, such as paper, placed around a transfer drum makes four rotations, during which magenta, yellow, cyan, and black toner on a photosensitive body are sequentially transferred every rotation to the recording medium to reproduce a color image. This method can achieve relatively high image quality. However, a thick recording medium such as a thick paper sheet like a postcard is difficult to place around the transfer drum. Thus, the types of recording medium that can be used are limited.

As compared with the image-on-image development, the tandem method, and the transfer drum method, a presently proposed intermediate transfer method can achieve high image quality, does not cause an increase in the size of the apparatus, and is applicable to any recording medium.

In the intermediate transfer method, four photosensitive bodies for a magenta toner image, a yellow toner image, a cyan toner image, and a black toner image are disposed around intermediate transfer members, including a drum or a belt, onto which the toner images formed on the photosensitive bodies are temporarily transferred. The four color-toner images are sequentially transferred to the intermediate transfer members to form a color image. The color image is then transferred onto a recording medium, such as paper. Thus, four color-toner images superimposed to control the gradation can achieve high image quality. Furthermore, unlike the tandem method, photosensitive bodies are not disposed in series. This prevents the apparatus from increasing in size. In addition, because a recording medium is not placed around a drum, any recording medium can be used.

As an example of an apparatus for forming a color image by the intermediate transfer method, FIG. 3 illustrates an image-forming apparatus including an endless belt as an intermediate transfer member.

In FIG. 3, reference numeral 11 denotes a cylindrical photosensitive body, which rotates in the direction of the arrow. The photosensitive body 11 is electrified by a primary charger 12. The projection of a light image 13 onto the photosensitive body 11 then removes electric charges on the exposed portion of the photosensitive body 11, thus forming an electrostatic latent image corresponding to a first color component. The electrostatic latent image is developed with first color toner, magenta toner M, by an image-developing unit 41, thus forming a magenta toner image on the photosensitive body 11. The magenta toner image on the photosensitive body 11 is transferred to an intermediate transfer member 20 while the intermediate transfer member 20 driven by a drive roller (drive unit) 30 is in contact with the photosensitive body 11. More specifically, the magenta toner image is transferred from the photosensitive body 11 to the intermediate transfer member 20 at a nip between the photosensitive body 11 and the intermediate transfer member 20 by the application of a primary transfer bias impressed to the intermediate transfer member 20 by a power supply 61. After the first color, magenta, toner image is transferred onto the intermediate transfer member 20, the surface of the photosensitive body 11 is cleaned with a cleaning apparatus 14, thus completing a first rotation of the photosensitive body 11 for developing and transferring. During additional three rotations of the photosensitive body, a second color, cyan, toner image, a third color, yellow, toner image, and a fourth color, black, toner image are sequentially formed every rotation on the photosensitive body 11 by developing units 42 to 44. The toner images are sequentially transferred every rotation to the intermediate transfer member 20 such that one toner image is superimposed on another, thus finally forming a composite color toner image corresponding to a desired color image on the intermediate transfer member 20. In the apparatus illustrated in FIG. 3, the developing units 41 to 44 sequentially come to the transferring position in synchronization with the rotation of the photosensitive body 11. Thus, the magenta toner M, the cyan toner C, the yellow toner Y, and the black toner B are sequentially developed.

The intermediate transfer member 20 on which the composite color toner image is formed is then brought into contact with a transfer roller 25. A recording medium 26, such as paper, is fed from a paper cassette 19 to a nip between the intermediate transfer member 20 and the transfer roller 25. At the same time, a secondary transfer bias is applied to the transfer roller 25 by a power supply 29 to transfer the composite color toner image from the intermediate transfer member 20 to the recording medium 26. The composite color toner image is thermally fixed on the recording medium 26, thus forming a final image. After the composite color toner image is transferred onto the recording medium 26, the residual toner on the intermediate transfer member 20 is removed by a cleaning apparatus 35. Thus, the intermediate transfer member 20 is reset to the initial state, preparing for the next image formation.

A fourth method is a tandem intermediate transfer method, which is a combination of the tandem method and the intermediate transfer method. FIG. 4 illustrates an image-forming apparatus for use in the tandem intermediate transfer method.

A color image is formed with the image-forming apparatus having a tandem intermediate transfer member in the form of an endless belt.

The image-forming apparatus includes a first developing part 54a to a fourth developing part 54d disposed along a tandem intermediate transfer member 50. The first developing part 54a to the fourth developing part 54d develop electrostatic latent images formed on the respective photosensitive drums 52a to 52d with yellow, magenta, cyan, and black. While the tandem intermediate transfer member 50 moves in the direction of the arrow, four color-toner images formed on the respective photosensitive drums 52a to 52d in the developing parts 54a to 54d are sequentially transferred onto the tandem intermediate transfer member 50, thus forming a color toner image. The color toner image is then transferred onto a recording medium 53, such as paper, to print out.

In FIG. 4, reference numeral 55 denotes a drive roller or a tension roller for moving the tandem intermediate transfer member 50, reference numeral 56 denotes a recording medium feed roller, reference numeral 57 denotes a recording medium feeder, and reference numeral 58 denotes a fixing apparatus for fixing an image formed on a recording medium, for example, by heating. Furthermore, reference numeral 59 denotes a power supply (voltage-application means) for applying a voltage to the tandem intermediate transfer member 50. The power supply 59 can reverse the polarity of the bias voltage to transfer a toner image from the photosensitive drums 52a to 52d to the tandem intermediate transfer member 50 and a toner image from the tandem intermediate transfer member 50 to the recording medium 53.

In the image-forming apparatuses described above, electroconductive endless belts used as the transferring and conveying belt 10, the intermediate transfer member 20, and the tandem intermediate transfer member 50 are heretofore mainly semiconductive resin film belts or fiber-reinforced rubber belts. The resin film belts are, for example, electroconductive endless belts that include, as a substrate, a thermoplastic polyalkylene naphthalate resin, or a polymer alloy or a polymer blend of the thermoplastic polyalkylene naphthalate resin and another thermoplastic resin, as described in Patent Document 1.

Patent Document 2 describes a technique in which a crystalline resin having at least one selected from the group consisting of a hydroxyl group, carboxylic acid, and an ester bond, an amorphous resin having at least one selected from the group consisting of a hydroxyl group, carboxylic acid, and an ester bond, and a polymerization catalyst are heated, mixed, and then formed into a seamless belt, for the purpose of manufacturing a flexible seamless belt that exhibits no appreciable deterioration in physical properties resulting from a reaction during melt blending.

Patent Document 1: Japanese Unexamined Patent Application Publication No. 2002-132053 (claims etc.)

Patent Document 2: Japanese Unexamined Patent Application Publication No. 2001-247677 (claims etc.)

DISCLOSURE OF INVENTION

Problems to be Solved by the Invention

The electroconductive endless belts used in the image-forming apparatuses described above must have flexibility, anti-setting properties, and high mechanical strength so that the belts can withstand repeated continuous operation. Furthermore, the electroconductive endless belts must have a high gloss, as a surface optical property, and consistently high electrical conductivity. Although the technique described in Patent Document 1 can provide an electroconductive endless belt that has a predetermined high strength, in particular bending resistance and creep resistance, and dimensional stability, glossiness is not taken into account. Furthermore, as the performance of image-forming apparatuses has improved in recent years, electroconductive endless belts that have higher durability are desired.

Accordingly, it is an object of the present invention to provide an electroconductive endless belt that can withstand repeated continuous operation, in particular has anti-setting properties, and has consistent glossiness and electrical conductivity. It is another object of the present invention to provide an image-forming apparatus including the electroconductive endless belt.

Means for Solving the Problems

As a result of extensive research, the present inventors found that the following structure can solve the problems described above and came to achieve the present invention.

According to one aspect of the present invention, a transferring and conveying tandem electroconductive endless belt is driven by a drive unit to convey a recording medium held by electrostatic adsorption through four types of image-forming units so that toner images are transferred onto the recording medium. The transferring and conveying tandem electroconductive endless belt contains:

a substrate and a conductive filler, the substrate including a thermoplastic polyalkylene naphthalate resin and at least two types of thermoplastic resins having an ester bond other than the thermoplastic polyalkylene naphthalate resin, wherein the weight ratio of the thermoplastic polyalkylene naphthalate resin to the at least two types of thermoplastic resins having an ester bond is in the range of 95:5 to 55:45, and the at least two types of thermoplastic resins having an ester bond include at least one amorphous thermoplastic resin and at least one crystalline thermoplastic resin.

According to another aspect of the present invention, an electroconductive endless belt is disposed between an image-forming unit and a recording medium, is driven by a drive unit, and is used as an intermediate transfer member that temporarily transfers a toner image formed on the image-forming unit onto the electroconductive endless belt and then transfers the toner image onto the recording medium. The electroconductive endless belt contains:

a substrate and a conductive filler, the substrate including a thermoplastic polyalkylene naphthalate resin and at least two types of thermoplastic resins having an ester bond other than the thermoplastic polyalkylene naphthalate resin, wherein the weight ratio of the thermoplastic polyalkylene naphthalate resin to the at least two types of thermoplastic resins having an ester bond is in the range of 95:5 to 55:45, and the at least two types of thermoplastic resins having an ester bond include at least one amorphous thermoplastic resin and at least one crystalline thermoplastic resin.

According to still another aspect of the present invention, an electroconductive endless belt is disposed between four types of image-forming units and a recording medium, is driven by a drive unit, and serves as a tandem intermediate transfer member that temporarily and sequentially transfers toner images formed on the four types of image-forming units onto the electroconductive endless belt and then transfers the toner images onto the recording medium. The electroconductive endless belt contains:

a substrate and a conductive filler, the substrate including a thermoplastic polyalkylene naphthalate resin and at least two types of thermoplastic resins having an ester bond other than the thermoplastic polyalkylene naphthalate resin, wherein the weight ratio of the thermoplastic polyalkylene naphthalate resin to the at least two types of thermoplastic resins having an ester bond is in the range of 95:5 to 55:45, and the at least two types of thermoplastic resins having an ester bond include at least one amorphous thermoplastic resin and at least one crystalline thermoplastic resin.

The thermoplastic polyalkylene naphthalate resin for use in the present invention is preferably a polybutylene naphthalate resin. Furthermore, the crystalline thermoplastic resin having an ester bond is preferably a polybutylene terephthalate resin or a polyethylene terephthalate resin. The amorphous thermoplastic resin having an ester bond preferably contains a glycol-modified polyalkylene terephthalate resin or a polyester elastomer. Preferably, the conductive filler is 5 to 30 parts by weight of carbon black per 100 parts by weight of the substrate. The endless belt preferably has a volume resistivity in the range of $10^2 \Omega \cdot cm$ to $10^{13} \Omega \cdot cm$.

Furthermore, an image-forming apparatus according to the present invention includes the electroconductive endless belt according to the present invention.

Advantages of the Invention

Accordingly, the present invention provides an electroconductive endless belt that can withstand repeated continuous operation, in particular has anti-setting properties and flexibility, and has appropriate glossiness and electrical conductivity. The present invention also provides an image-forming apparatus including the electroconductive endless belt.

Figure 1:
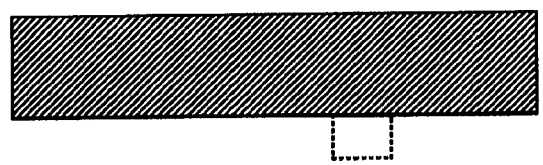
FIG. 1 is a transverse cross-sectional view of an electroconductive endless belt according to an embodiment of the present invention.
Figure 1:
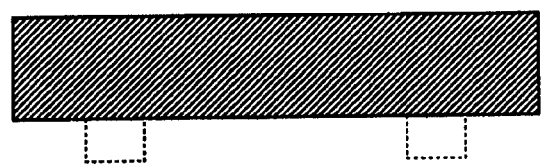

REFERENCE NUMERALS 1, 11, 52a to 52d photosensitive drum
2, 7 charging roller
3 developing roller
4 developing blade
5 toner-supply roller
6 cleaning blade
8 charge-removing roller
9, 30, 55 drive roller (drive unit)
10 transferring and conveying belt
12 primary charger
13 projection of light image
14, 35 cleaning apparatus
19 paper cassette
20 intermediate transfer member
25 transfer roller
26, 53 recording medium 29, 61 power supply
41, 42, 43, 44 developing unit
50 tandem intermediate transfer member
54a to 54d first developing part to fourth developing part
56 recording medium feed roller
57 recording medium feeder
58 fixing apparatus
59 power supply (voltage-application means)

BEST MODE FOR CARRYING OUT THE INVENTION

Preferred embodiments of the present invention will be described in detail below.

In general, electroconductive endless belts are divided into jointed endless belts and un-jointed endless belts (so-called seamless belts). An electroconductive endless belt according to the present invention may be of either type. Preferably, an electroconductive endless belt according to the present invention is a seamless belt. An electroconductive endless belt according to the present invention can be used as a transfer member for the tandem method, the intermediate transfer method, and the tandem intermediate transfer method, as described above.

Figure 2:
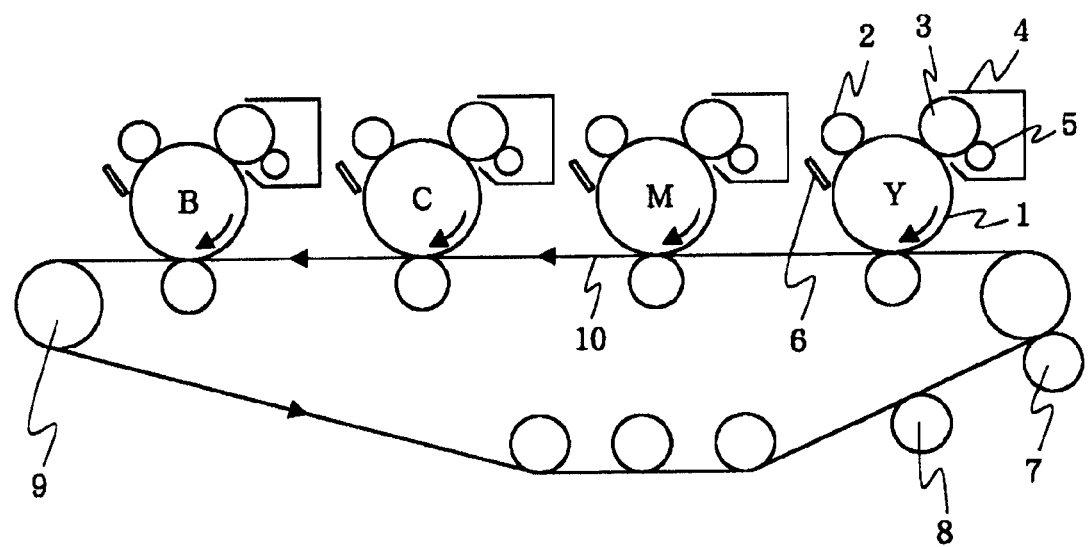
FIG. 2 is a schematic view of a tandem image-forming apparatus including a transferring and conveying belt as an example of an image-forming apparatus according to the present invention.

When an electroconductive endless belt according to the present invention is a transferring and conveying belt as denoted by reference numeral 10 in FIG. 2, the endless belt is driven by a drive unit, such as a drive roller 9, to sequentially transfer toners onto a recording medium conveyed on the endless belt, thus forming a color image.

Figure 3:
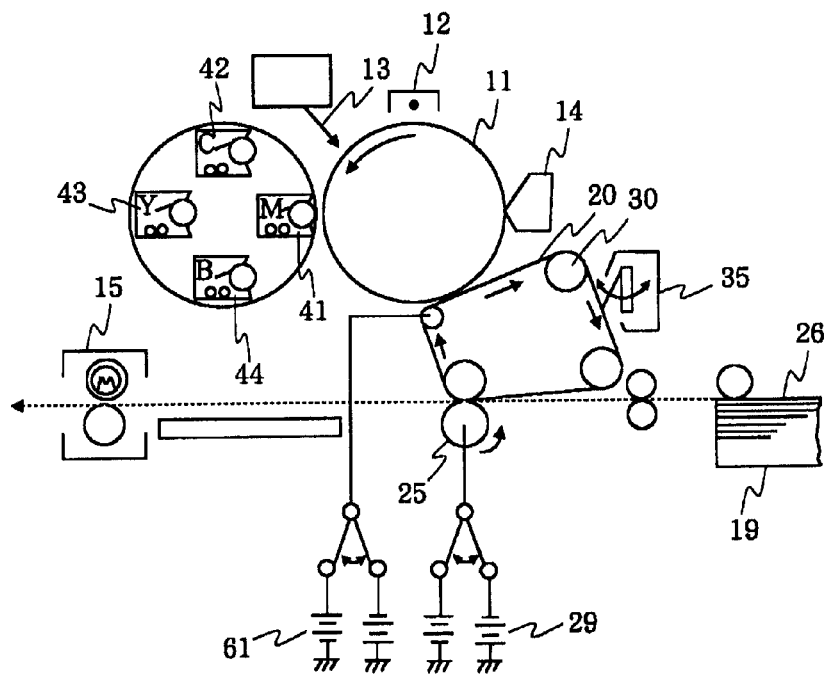
FIG. 3 is a schematic view of an intermediate transfer apparatus including an intermediate transfer member, as another example of an image-forming apparatus according to the present invention.

Furthermore, when an electroconductive endless belt according to the present invention is an intermediate transfer member as denoted by reference numeral 20 in FIG. 3, the endless belt is driven by a drive unit, such as a drive roller 30, between a photosensitive drum (latent image carrier) 11 and a recording medium 26, such as paper, to temporarily transfer a toner image formed on the photosensitive drum 11 onto the endless belt and then transfer the toner image onto the recording medium 26. The apparatus illustrated in FIG. 3 performs color printing by the intermediate transfer method, as described above.

Figure 4:
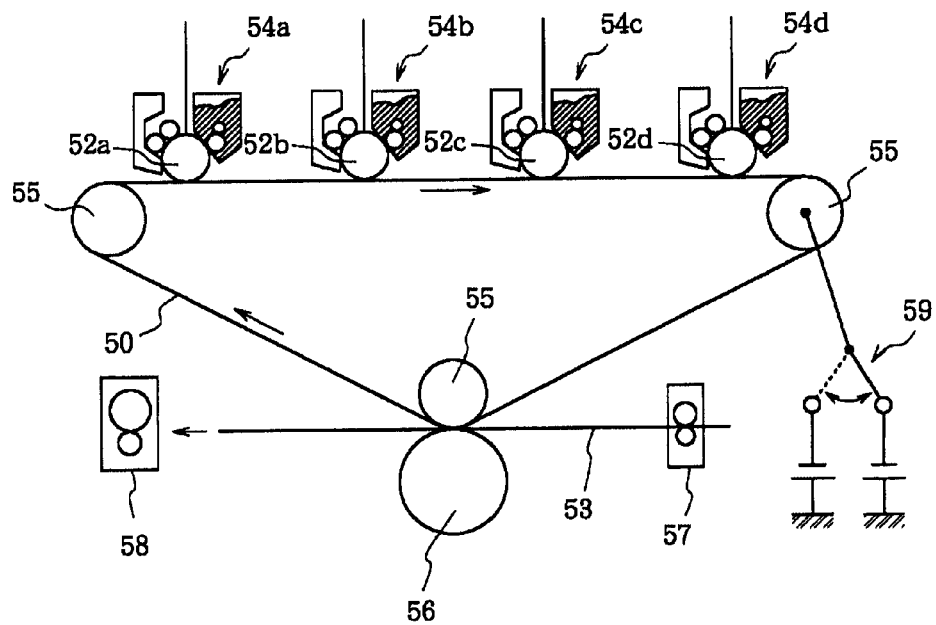
FIG. 4 is a schematic view of a tandem intermediate transfer apparatus including a tandem intermediate transfer member, as another example of an image-forming apparatus according to the present invention.

Furthermore, when an electroconductive endless belt according to the present invention is a tandem intermediate transfer member as denoted by reference numeral 50 in FIG. 4, the endless belt is driven by a drive unit, such as a drive roller 55, between developing parts 54a to 54d including photosensitive drums 52a to 52d and a recording medium 53, such as paper, to temporarily transfer four color-toner images formed on each of the photosensitive drums 52a to 52d onto the endless belt and then transfer them onto the recording medium 53, thus forming a color image.

An electroconductive endless belt according to the present invention contains a substrate and a conductive filler, the substrate containing a (a) thermoplastic polyalkylene naphthalate resin and at least two types of (b) thermoplastic resins having an ester bond other than the thermoplastic polyalkylene naphthalate resin, wherein the weight ratio of the (a) thermoplastic polyalkylene naphthalate resin to the (b) thermoplastic resins having an ester bond is in the range of 95:5 to 55:45, and the (b) thermoplastic resins having an ester bond contain at least one amorphous thermoplastic resin and at least one crystalline thermoplastic resin.

The reason for using the (b) thermoplastic resins having an ester bond in combination with the (a) thermoplastic polyalkylene naphthalate resin in the substrate is that the ester-based resin can enhance the compatibility with the same ester-based (a) thermoplastic polyalkylene naphthalate resin, thus improving the surface gloss of the belt. Furthermore, the surface characteristics, the flexibility, and the creep resistance of the belt can be maintained for the weight ratio (a):(b) in the range defined above. The limited amount of crystalline ester resin can further improve the flexibility. In addition, the amorphous ester resin can control the surface resistivity, thereby improving the anti-setting properties. In the present invention, the physical properties of the belt was found to be improved dramatically with better balance by combining the (a) thermoplastic polyalkylene naphthalate resin with the at least two types of (b) thermoplastic resins having an ester bond at a predetermined ratio of (a):(b) and by combining the crystalline thermoplastic resin with the amorphous thermoplastic resin of the (b) thermoplastic resins having an ester bond.

Examples of the (a) thermoplastic polyalkylene naphthalate resin used as the substrate according to the present invention include a polybutylene naphthalate (PEN) resin and a polyethylene naphthalate (PEN) resin. A PBN resin is preferred. These resins are commercially available. For example, the PBN resin may be TQB-OT from Teijin Chemicals Ltd.

Furthermore, preferred examples of the crystalline thermoplastic resin in the (b) thermoplastic resins having an ester bond include a polybutylene terephthalate (PBT) resin and a polyethylene terephthalate (PET) resin. Preferred examples of the amorphous thermoplastic resin include glycol-modified polyalkylene terephthalate resins, such as a glycol-modified polyethylene terephthalate (PET-G) resin and a glycol-modified polycyclohexylenedimethylene terephthalate (PCT-G) resin, and polyester elastomers. Preferred examples of polyester elastomers include polyester-polyester elastomers having a polyester hard segment and a polyester soft segment and polyester-polyether elastomers having a polyester hard segment and a polyether soft segment. While hard segments of polyester elastomers generally contain PBT or PBN as a main component, both PBT and PBN may be used in the present invention. PBT and PBN are commercially available. Examples of the PBT resin include Toraycon 1401 from Toray Industries, Inc. Examples of the glycol-modified polyalkylene terephthalate resin include 6763 from Eastman Chemical Company. Furthermore, examples of the polyester elastomer include NUBELAN P4110 and NUBELAN B4063 from Teijin Chemicals Ltd. and PELPRENE S-1001 and PELPRENE EN-1000 from Toyobo Co., Ltd.

Furthermore, the conductive filler may be, but not limited to, an electroconductive agent or an ion carrier. Examples of the electroconductive agent include electroconductive carbon, such as ketjen black and acetylene black; carbon for rubber, such as SAF, ISAF, HAF, FEF, GPF, SRF, FT, and MT; oxidized carbon for color (ink); pyrolytic carbon; natural graphite; synthetic graphite; metal and metal oxides, such as antimony-doped tin oxide, titanium oxide, zinc oxide, nickel, copper, silver, and germanium; electroconductive polymers, such as polyaniline, polypyrrole, and polyacetylene; and electroconductive whiskers, such as carbon whisker, graphite whisker, titanium carbide whisker, electroconductive potassium titanate whisker, electroconductive barium titanate whisker, electroconductive titanium oxide whisker, and electroconductive zinc oxide whisker. Furthermore, examples of the ion carrier include ammonium salts of perchlorates, chlorates, hydrochlorides, bromates, iodates, fluoroborates, sulfates, ethylsulfates, carboxylates, and sulfonates, such as tetraethylammonium, tetrabutylammonium, dodecyltrimethylammonium, hexadecyltrimethylammonium, benzyltrimethylammonium, and modified fatty acid dimethylethylammonium; and perchlorates, chlorates, hydrochlorides, bromates, iodates, fluoroborates, sulfates, trifluoromethylsulfates, and sulfonates of alkali metals and alkaline earth metals, such as lithium, sodium, potassium, calcium, and magnesium.

These conductive fillers may be used alone or in combination. For example, a combination of an electroconductive agent and an ion carrier allows the belt to have consistent electrical conductivity, independent of variations in applied voltage or environmental variations.

The amount of the electroconductive agent is typically 100 parts by weight or less, for example, 1 to 100 parts by weight, preferably 1 to 80 parts by weight, more preferably 10 to 50 parts by weight, per 100 parts by weight of substrate. The amount of the ion carrier is typically in the range of 0.01 to 10 parts by weight, preferably 0.05 to 5 parts by weight, per 100 parts by weight of resin. In the present invention, the conductive filler is preferably 5 to 30 parts by weight of carbon black per 100 parts by weight of substrate.

In addition to the conductive filler, another functional component can be added to an electroconductive endless belt according to the present invention without compromising the advantages of the present invention. Examples of the functional component include filling materials, coupling agents, antioxidants, lubricants, surface-treating agents, pigments, ultraviolet absorbers, antistatic agents, dispersants, neutralizing agents, forming agents, and cross-linkers. Furthermore, a coloring agent may be added to the belt for coloring.

An electroconductive endless belt according to the present invention may have any thickness depending on the form of the transferring and conveying belt or the intermediate transfer member, and is preferably in the range of 50 to 200 μm. Furthermore, an electroconductive endless belt according to the present invention has a surface roughness preferably of 10 μm or less, more preferably of 6 μm or less, still more preferably of 3 μm or less, as determined by ten-point height of irregularities Rz in conformity to the JIS Standards. Furthermore, an electroconductive endless belt according to the present invention has a volume resistivity preferably in the range of $10^2 \Omega \cdot cm$ to $10^{13} \Omega \cdot cm$.

Furthermore, as indicated by an alternate long and short dashed line in FIG. 1, an electroconductive endless belt according to the present invention may have a fitting part to be engaged with a fitting part (not shown) of a drive unit, such as the drive roller 9 in the image-forming apparatus in FIG. 2 or the drive roller 30 in FIG. 3. An electroconductive endless belt having such a fitting part to be engaged with a fitting part (not shown) of a drive unit can be driven without shifting in the width direction.

Preferably, the fitting part is, but not limited to, a raised line extending in the circumferential direction (rotation direction) of the belt, as illustrated in FIG. 1, and the raised line is fitted into a recessed line formed in a drive unit, such as a drive roller, in the circumferential direction.

While a single raised line is formed as a fitting part in FIG. 1(a), the fitting part may be composed of a lot of raised portions aligned in the circumferential direction (rotation direction) of the belt. Furthermore, the belt may have two fitting parts (FIG. 1(b)) or a fitting part in the middle of the width of the belt. Furthermore, instead of the raised line illustrated in FIG. 1, a recessed line may be formed as a fitting part in the belt in the circumferential direction (rotation direction). The recessed line may be fitted onto a raised line formed on a drive unit, such as the drive roller, in the circumferential direction.

Examples of an image-forming apparatus according to the present invention including an electroconductive endless belt according to the present invention include, but not limited to, those utilizing the tandem method as illustrated in FIG. 2, those utilizing the intermediate transfer method as illustrated in FIG. 3, and those utilizing the tandem intermediate transfer method as illustrated in FIG. 4. In the apparatus illustrated in FIG. 3, a voltage can appropriately be applied by a power supply 61 to a drive roller or a drive gear for driving the intermediate transfer member 20 according to the present invention. In this case, the voltage may appropriately be applied by the passage of a direct current or a direct current with a superimposed alternating current.

EXAMPLES

The present invention will be described in more detail with reference to the following examples.

Examples 1 to 11 and Comparative Examples 1 and 2

The components shown in Tables 1 and 2 were melted and kneaded in a twin-screw kneader. The kneaded compounds were extruded from a ring die into electroconductive endless belts having an inner diameter of 220 mm, a thickness of 100 μm, and a width of 250 mm, according to the examples and the comparative examples. The belts were evaluated according to the following procedures. As an overall rating, a belt suited to practical use was denoted by "pass", and a belt unsuited to practical use was denoted by "fail".

<Measurements of Volume Resistivity>

The volume resistivity and the surface resistivity of a belt were measured with a resistance meter R8340A (Advantest Corporation) coupled to a sample chamber R12704A at a temperature of 20° C., a relative humidity of 50%, and a measuring voltage of 500 V and 1000 V, respectively.

<Anti-Setting Properties>

A stretched belt was placed at a temperature of 30° C. and a relative humidity of 85% for 24 hours. The belt was then installed in a real apparatus and was evaluated for running performance. Stable running was denoted by "pass", and extremely meandering running or idling was denoted by "fail".

<Number of Bendings Before Failure>

The number of bendings before failure was measured with an MIT type folding endurance tester from Toyo Seiki Seisaku-Sho, Ltd. The number was normalized to the number in Comparative Example 1, which was set to be 250. A larger number indicates a better result.

<Glossiness>

The glossiness of a belt was measured with a gloss checker IG-320 from Horiba, Ltd.

The above-mentioned measurements were summarized in Tables 1 and 2.

TABLE 1

|  |  |  | Example 1 | Example 2 | Example 3 | Example 4 | Comparative Example 1 | Comparative Example 2 |
|---|---|---|---|---|---|---|---|---|
| Composition of belt | Thermoplastic polyalkylene naphthalate resin | A[1] | 80 | 80 | 60 | 60 | 40 | 80 |
|  | Thermoplastic resin having ester bond | B[2] | 15 | 15 | 30 | 30 | 55 | 20 |
|  |  | C[3] | 5 | — | 10 | — | 5 | — |
|  |  | D[4] | — | 5 | — | 10 | — | — |
|  | Carbon black[5] |  | 15 | 15 | 20 | 20 | 15 | 15 |

TABLE 1-continued

|  | Example 1 | Example 2 | Example 3 | Example 4 | Comparative Example 1 | Comparative Example 2 |
|---|---|---|---|---|---|---|
| Volume resistivity (500 V) ($\Omega \cdot$ cm) | $1 \times 10^{10}$ | $1 \times 10^{10}$ | $1 \times 10^{8}$ | $1 \times 10^{8}$ | $1 \times 10^{10}$ | $1 \times 10^{10}$ |
| Surface resistivity (1000 V) ($\Omega$) | $1 \times 10^{12}$ | $1 \times 10^{12}$ | $1 \times 10^{10}$ | $1 \times 10^{10}$ | $1 \times 10^{14}$ | $1 \times 10^{14}$ |
| Anti-setting properties | ○ | ○ | ○ | ○ | X | X |
| Number of bendings before failure | 1000≦ | 1000≦ | 1000≦ | 1000≦ | 250 | 1000≦ |
| Glossiness | 80 | 85 | 75 | 75 | 50 | 50 |
| Overall rating Example | ○ | ○ | ○ | ○ | X | X |

[1] Thermoplastic polyalkylene naphthalate resin A: PBN (Teijin Chemicals Ltd.), TQB-OT
[2] Thermoplastic resin having ester bond B: PBT (Toray Industries, Inc.), Toraycon 1401 (crystalline)
[3] Thermoplastic resin having ester bond C: PET-G, Eastman Chemical Company, 6763 (amorphous)
[4] Thermoplastic resin having ester bond D: PCT-G, Eastman Chemical Company (amorphous)
[5] Carbon black: Denki Kagaku Kogyo K.K., DENKA BLACK

TABLE 2

| | | | Example 5 | Example 6 | Example 7 | Example 8 | Example 9 | Example 10 | Example 11 |
|---|---|---|---|---|---|---|---|---|---|
| Composition of belt | Thermoplastic polyalkylene naphthalate resin | A[1] | 76 | 73 | 76 | 78 | 76 | 76 | 76 |
| | Thermoplastic resin having ester bond | B[2] | 19 | 18 | 19 | 20 | 19 | 19 | 19 |
| | | E[6] | 5 | 9 | — | — | — | — | — |
| | | F[7] | — | — | 5 | — | — | — | — |
| | | G[8] | — | — | — | 2 | 5 | — | — |
| | | H[9] | — | — | — | — | — | 5 | 5 |
| | Carbon black[5] | | 15 | 15 | 15 | 15 | 15 | 15 | 16 |
| Volume resistivity (500 V) ($\Omega \cdot$ cm) | | | $3 \times 10^{10}$ | $1 \times 10^{10}$ | $3 \times 10^{10}$ | $4 \times 10^{10}$ | $2 \times 10^{10}$ | $4 \times 10^{10}$ | $5 \times 10^{10}$ |
| Surface resistivity (1000 V) ($\Omega$) | | | $1 \times 10^{12}$ | $5 \times 10^{11}$ | $1 \times 10^{12}$ | $1 \times 10^{12}$ | $1 \times 10^{12}$ | $1 \times 10^{12}$ | $1 \times 10^{12}$ |
| Anti-setting properties | | | ○ | ○ | ○ | ○ | ○ | ○ | ○ |
| Number of bendings before failure | | | 1000≦ | 1000≦ | 1000 | 1000 | 1000≦ | 1000≦ | 1000≦ |
| Glossiness | | | 68 | 65 | 67 | 68 | 62 | 65 | 65 |
| Overall rating Example | | | ○ | ○ | ○ | ○ | ○ | ○ | ○ |

[6] Thermoplastic resin having ester bond E: polyester elastomer (polyester-polyester type): Teijin Chemicals Ltd., NUBELAN (trade name) P4110 (amorphous)
[7] Thermoplastic resin having ester bond F: polyester elastomer (polyester-polyester type): Toyobo Co., Ltd, PELPRENE (trade name) S-1001 (amorphous)
[8] Thermoplastic resin having ester bond G: polyester elastomer (polyester-polyether type): Teijin Chemicals Ltd., NUBELAN (trade name) B4063 (amorphous)
[9] Thermoplastic resin having ester bond H: polyester elastomer (polyester-polyether type): Toyobo Co., Ltd, PELPRENE (trade name) EN-1000 (amorphous)

Tables 1 and 2 show that the belts of Examples composed of a substrate containing a thermoplastic polyalkylene naphthalate resin, an amorphous thermoplastic resin having an ester bond, and a crystalline thermoplastic resin having an ester bond at a predetermined weight ratio and a conductive filler exhibited high electrical conductivity, excellent anti-setting properties, excellent flexibility, and a high glossiness. In contrast, Comparative Example 1, which did not satisfy the specified weight ratio, and Comparative Example 2, which contained no amorphous thermoplastic resin, showed poor results for each evaluation item, as compared with Examples.

The invention claimed is:

1. A transferring and conveying tandem electroconductive endless belt that is driven by a drive unit to convey a recording medium held by electrostatic adsorption through four types of image-forming units so that toner images are transferred onto the recording medium, comprising:

a substrate and a conductive filler, the substrate including a thermoplastic polyalkylene naphthalate resin and at least two types of thermoplastic resins having an ester bond other than the thermoplastic polyalkylene naphthalate resin, wherein the weight ratio of the thermoplastic polyalkylene naphthalate resin to the at least two types of thermoplastic resins having an ester bond is in the range of 95:5 to 55:45, and the at least two types of thermoplastic resins having an ester bond include at least one amorphous thermoplastic resin and at least one crystalline thermoplastic resin, and wherein the thermoplastic polyalkylene naphthalate resin comprises a polybutylene naphthalate resin.

2. The electroconductive endless belt according to claim 1, wherein the crystalline thermoplastic resin having an ester bond comprises a polybutylene terephthalate resin or a polyethylene terephthalate resin.

3. The electroconductive endless belt according to claim 1, wherein the amorphous thermoplastic resin having an ester bond comprises a glycol-modified polyalkylene terephthalate resin.

4. The electroconductive endless belt according to claim 1, wherein the amorphous thermoplastic resin having an ester bond comprises a polyester elastomer.

5. The electroconductive endless belt according to claim 1, wherein the conductive filler is 5 to 30 parts by weight of carbon black per 100 parts by weight of the substrate.

6. The electroconductive endless belt according to claim 1, wherein the electroconductive endless belt has a volume resistivity in the range of $10^2 \Omega \cdot$cm to $10^{13} \Omega \cdot$cm.

7. An image-forming apparatus including the electroconductive endless belt according to claim 1.

8. An electroconductive endless belt that is disposed between an image-forming unit and a recording medium, is driven by a drive unit, and is used as an intermediate transfer member that temporarily transfers a toner image formed on the image-forming unit onto the electroconductive endless belt and then transfers the toner image onto the recording medium, the electroconductive endless belt comprising:

a substrate and a conductive filler, the substrate including a thermoplastic polyalkylene naphthalate resin and at least two types of thermoplastic resins having an ester bond other than the thermoplastic polyalkylene naphthalate resin, wherein the weight ratio of the thermoplastic polyalkylene naphthalate resin to the at least two types of thermoplastic resins having an ester bond is in the range of 95:5 to 55:45, and the at least two types of thermoplastic resins having an ester bond include at least one amorphous thermoplastic resin and at least one crystalline thermoplastic resin, and wherein the thermoplastic polyalkylene naphthalate resin comprises a polybutylene naphthalate resin.

9. The electroconductive endless belt according to claim 8, wherein the crystalline thermoplastic resin having an ester bond comprises a polybutylene terephthalate resin or a polyethylene terephthalate resin.

10. The electroconductive endless belt according to claim 8, wherein the amorphous thermoplastic resin having an ester bond comprises a glycol-modified polyalkylene terephthalate resin.

11. The electroconductive endless belt according to claim 8, wherein the amorphous thermoplastic resin having an ester bond comprises a polyester elastomer.

12. The electroconductive endless belt according to claim 8, wherein the conductive filler is 5 to 30 parts by weight of carbon black per 100 parts by weight of the substrate.

13. The electroconductive endless belt according to claim 8, wherein the electroconductive endless belt has a volume resistivity in the range of $10^2 \Omega \cdot cm$ to $10^{13} \Omega \cdot cm$.

14. An image-forming apparatus including the electroconductive endless belt according to claim 8.

15. An electroconductive endless belt that is disposed between four types of image-forming units and a recording medium, is driven by a drive unit, and serves as a tandem intermediate transfer member that temporarily and sequentially transfers toner images formed on the four types of image-forming units onto the electroconductive endless belt and then transfers the toner images onto the recording medium, the electroconductive endless belt comprising:

a substrate and a conductive filler, the substrate including a thermoplastic polyalkylene naphthalate resin and at least two types of thermoplastic resins having an ester bond other than the thermoplastic polyalkylene naphthalate resin, wherein the weight ratio of the thermoplastic polyalkylene naphthalate resin to the at least two types of thermoplastic resins having an ester bond is in the range of 95:5 to 55:45, and the at least two types of thermoplastic resins having an ester bond include at least one amorphous thermoplastic resin and at least one crystalline thermoplastic resin, and wherein the thermoplastic polyalkylene naphthalate resin comprises a polybutylene naphthalate resin.

16. The electroconductive endless belt according to claim 15, wherein the crystalline thermoplastic resin having an ester bond comprises a polybutylene terephthalate resin or a polyethylene terephthalate resin.

17. The electroconductive endless belt according to claim 15, wherein the amorphous thermoplastic resin having an ester bond comprises a glycol-modified polyalkylene terephthalate resin.

18. The electroconductive endless belt according to claim 15, wherein the amorphous thermoplastic resin having an ester bond comprises a polyester elastomer.

19. The electroconductive endless belt according to claim 15, wherein the conductive filler is 5 to 30 parts by weight of carbon black per 100 parts by weight of the substrate.

20. The electroconductive endless belt according to claim 15, wherein the electroconductive endless belt has a volume resistivity in the range of $10^2 \Omega \cdot cm$ to $10^{13} \Omega \cdot cm$.

21. An image-forming apparatus including the electroconductive endless belt according to claim 15.

* * * * *